Aug. 2, 1966  G. W. STILLEY ETAL  3,264,078
METHOD OF TEMPERING GLASS SHEETS SUPPORTED ON A BENDING MOLD
Filed March 29, 1965
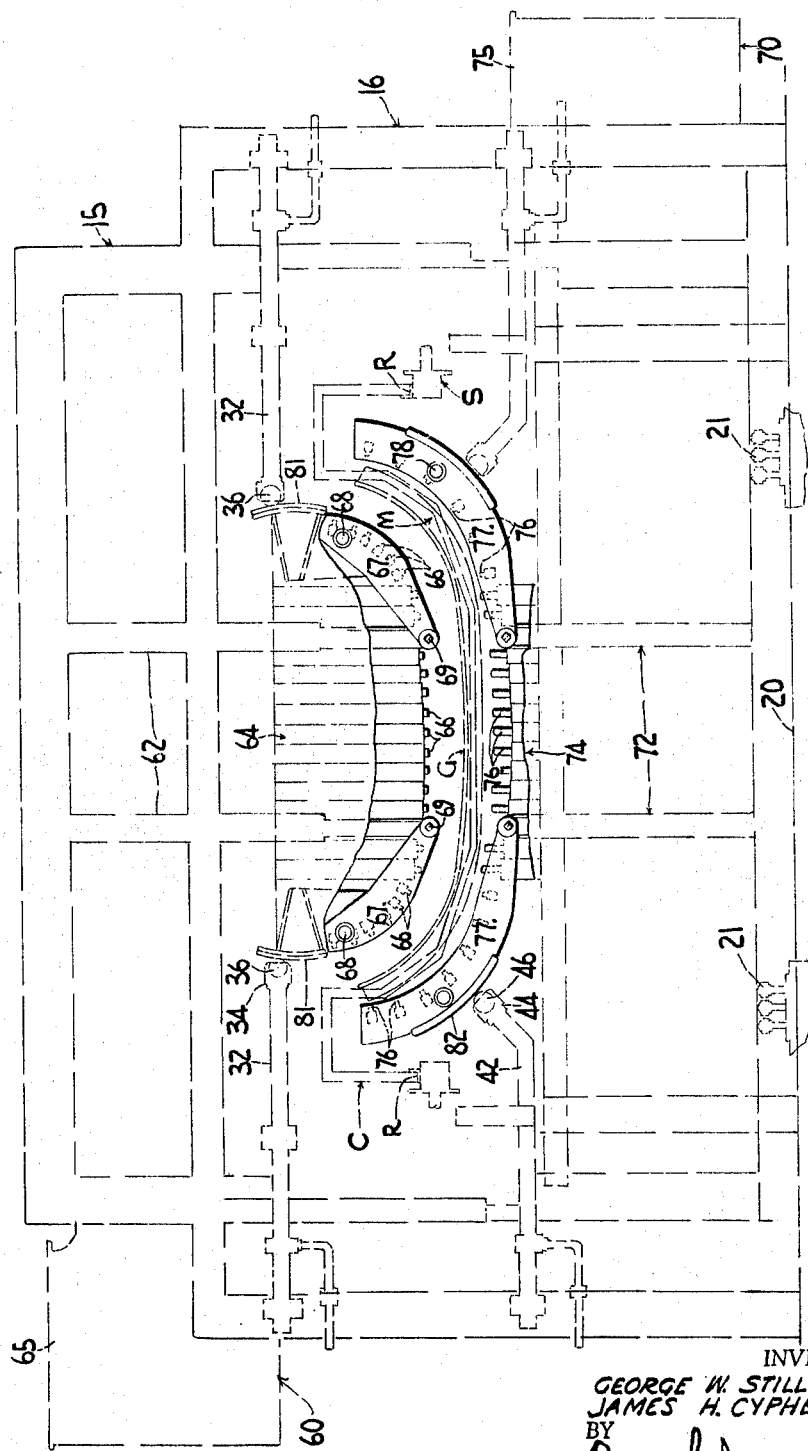
INVENTORS
GEORGE W. STILLEY and
JAMES H. CYPHER
BY
Oscar L. Spencer
ATTORNEY United States Patent Office 3,264,078
Patented August 2, 1966

3,264,078
METHOD OF TEMPERING GLASS SHEETS
SUPPORTED ON A BENDING MOLD
George W. Stilley, Freeport, and James H. Cypher, New Kensington, Pa., assignors to Pittsburgh Plate Glass Company, Pittsburgh, Pa., a corporation of Pennsylvania
Filed Mar. 29, 1965, Ser. No. 443,213
6 Claims. (Cl. 65—25)

This application is a continuation-in-part of application Serial No. 332,329 of George W. Stilley and James H. Cypher, for Treating Glass Sheets, filed December 10, 1963, as a continuation-in-part of application Serial No. 764,816 of George W. Stilley and James H. Cypher, filed October 2, 1958, for Treating Glass Sheets, both now abandoned.

The present invention relates to Treating Glass Sheets, and specifically concerns improvements in tempering glass sheets, particularly those that have been bent on horizontally disposed molds and are supported on such molds for tempering.

In producing curved tempered glass sheets suitable for automobile backlights from flat glass sheets, it has been customary to mount individual flat, smoothly surfaced, glass sheets horizontally on sectionalized, skeletonized molds, comprising mold sections capable of moving into a spread position to support the flat glass sheets and into a closed position to form a curved shaping surface conforming in elevation and outline to the shape desired for the bent sheet. The spread molds laden with the horizontally disposed flat glass are conveyed through a bending lehr of tunnel-like configuration where the temperature of the glass is raised to a temperature sufficient for tempering (about 1200 to about 1250 degrees Fahrenheit for commercial plate, sheet or float glass of soda-lime-silica composition). As the glass softens, the mold sections move into the closed mold position and the glass sheets sag to conform to the mold shaping surfaces provided by the closed molds and thus are converted into bent sheets without affecting the smoothness of their surfaces substantially.

The closed molds supporting the heated bent glass sheets are then immediately conveyed between opposing blasts of tempering fluid, such as air, which chill the glass surfaces so rapidly that a steep temperature gradient is established between the glass surfaces and the interior of the sheets. This action results in sheets having their surfaces stressed in compression and their interiors in tension. The sheets so stressed are much stronger than untempered glass sheets. However, once the compressive skin is broken, the tension stresses locked in the interior of the sheet are released and cause the sheet to shatter into a large number of small fragments. Highly tempered glass is safest because (a) it is less likely to shatter than untempered glass because it requires a much larger external force to overcome a large compressive stress than a small compressive stress and (b) the greater the glass is stressed, the smaller are its fragments when the glass shatters. Occupants of an automobile are less likely to be injured severely by the smaller fragments of a shattered tempered glass sheet than by the jagged fragments of a glass sheet that is not highly tempered.

In the past, it has always been considered necessary to apply equal and opposite blasts onto the opposing surfaces of heated glass sheets during the quenching step of the tempering process. This was accomplished in both kinds of tempering operations known in the art as vertical tempering and horizontal tempering. In vertical tempering, the major surfaces of the glass sheet are substantially vertical during quenching and the glass sheet is either suspended from tongs that grip the glass near its top edge, or supported along its bottom edge and balanced along its top edge. In horizontal tempering, the glass sheet is supported along the marginal portion of its bottom major surface on a peripheral or skeletonized mold.

The size of automobile backlights used in recent years has increased to such an extent that the peripheral bending molds now support a greater mass than formerly. When enlarged glass sheets are heated on peripheral molds to glass softening temperatures for tempering or bending and tempering, the massive glass sheets tend to distort along the marginal portions thereof which remain in supported contact with the heated mold rails during subsequent cooling. In addition, the heated mold rails absorb a greater quantity of heat or, stated differently, have a higher thermal capacity than the glass sheet portions in contact therewith. Thus, the mold rails tend to retard the cooling of the supported portions of glass during subsequent tempering to such an extent that high tension stress zones are established adjacent the margin of the glass. A high tension stress zone adjacent the margin of a glass sheet will often cause the rejection or destruction of a glass sheet.

The present invention substantially reduces the rejection rate incidental to horizontal bending and tempering techniques while fabricating a bent tempered glass sheet from a flat glass sheet by a horizontal tempering method. The method involves bending the glass sheet into its desired shape at elevated temperatures and supporting the heated bent sheet in a horizontal position on a curved shaping surface, directing fluid blasts downwardly onto the upper curved surface of the heated bent glass sheet, and simultaneously directing fluid blasts upwardly onto the bottom curved surface of the bent glass sheet. According to the present invention, the difference in force applied against the upper and lower glass sheet surfaces is controlled so that the total force provided by the upwardly directed fluid blasts at the bottom curved surface exceeds the total force provided by the downwardly directed fluid blasts at the upper curved surface of the glass sheet to be tempered by an amount at least sufficient to cause the glass to make intermittent rather than continuous contact with the outline shaping surface of the mold.

Bending the flat glass sheet is preferably accomplished by supporting the flat sheet in a substantially horizontal plane above a suitable bending mold and heating the glass sheet to an elevated temperature sufficient to shape the glass sheet into conformity with the shape provided by the outline shaping surface of the mold. Immediately upon conforming the heat softened glass sheet to the shaping surface and while the bent glass sheet is supported on the shaping surface, the surfaces of the glass are exposed to the different forces imparted by the fluid blasts toward the opposite curved surfaces of the curved sheet.

The net upward force that results from the difference in forces applied to the opposite surfaces of the glass sheet lessens the effective mass of the heat-softened sheet on the mold and thus decreases the distortion of the glass sheet at its mold contacting surface.

In addition, the net upward force applied against the bottom surface of the bent glass resting near its margin on the outline shaping surface results in an increase in pressure in a chamber whose roof is formed by the lower surface of the glass resting on the mold and whose wall is formed by the outline shaping surface. This pressure increase lifts the glass out of contact with the outline shaping surface. When the glass is lifted off the outline shaping surface, the space between the glass and the shaping surface permits some of the upwardly blasted fluid to escape from the fluid chamber, thus permitting the glass sheet to lower toward and possibly into contact with the shaping surface. At this point, the cycle repeats. Thus, the heated, bent glass either "floats" in close adjacency to the outline shaping surface or contacts the shaping surface intermittently during the cooling step associated with tempering according to the present invention. This compares with continuous contact of the glass by the shaping surface during cooling by prior art techniques.

The intermittent upward and downward movement of the bent glass sheet relative to the shaping surface causes a pulsation of the air blasts against the surfaces of the glass. Such pulsation agitates the air and causes turbulence. The turbulence is a factor in inhibiting the formation of a skin of hot air against the surfaces of the glass that inhibits access of the cold air blasts into contact with the hot glass surfaces.

The skin of hot air tended to grow into one or more stagnant hot air masses at the boundary of the chamber having the bottom surface of the glass as its roof and the shaping rail of the mold as its wall. A continuous stagnant mass of hot air formed at the corner formed by a shaping rail and the glass where the upper shaping surface of the shaping rail was continuous. A multitude of stagnant masses of hot air formed between the teeth or ribs of shaping rails having serrated or notched shaping surfaces and the glass. The intermittent movement of the glass brought about by the present invention prevents the stagnant masses of air from forming and becoming heated. Instead, the air in those regions formerly causing trouble by heating is now forced to move from the region of trouble and is replaced by cold air blasts.

The turbulence of air caused by intermittent vertical glass movement causes what is termed a "scrubbing" action at the glass surface. The hot air film that formed using prior art techniques is "scrubbed" from the glass surface by the turbulence and replaced by cold air blasts. This constant replacement of cool air in the hitherto troublesome region, especially, is believed to be the main reason for the benefit obtained.

Furthermore, since the cooling fluid is applied more rapidly and in greater volume to the bottom surface than to the top surface of the bent glass sheet carried on the tempering iron, the additional cooling effect or cooling capacity of the lower blasts overcome the tendency of the heat absorbed by the tempering mold during bending to retard the cooling rate of the marginal portion of the glass sheet in contact therewith, which would impress a much higher tension stress in the glass along its line of contact with the tempering mold if the previously employed technique of equal and opposite blast forces were employed.

Up to the present time, tempering techniques require that a heat-softened glass sheet be provided with continuous support during its rapid cooling. The present invention has obtained improved stress pattern in the glass sheet by reducing its duration of contact with the shaping surface during its cooling.

An illustrative embodiment of the present invention will be described to provide an understanding of how the present invention operates with typical present day tempering apparatus.

In the drawing, a longitudinal sectional view of a portion of typical tempering apparatus is shown with a horizontally disposed bending and tempering mold supporting a bent glass sheet for tempering.

In the drawing, a bent glass sheet G is shown supported by a bending mold M being transported along a stub roll conveyor S by means of a carriage C of open work configuration provided with rails R that are supported on the stub roll conveyor S.

The mold M comprises a sectionalized shaping rail disposed edgewise. The upper edge of the shaping rail forms an outline shaping surface of the desired contour and elevation that is slightly smaller than the outline of the heated, bent glass sheet supported thereby for tempering. The shaping rail is preferably apertured or notched to provide paths for the removal of tempering fluid, such as air, from the vicinity of the glass surface after it has chilled the latter.

The tempering apparatus depicted is that described in U.S. Patent No. 2,790,270 to James M. Freiberg which issued on April 30, 1957. It comprises a movable frame housing 15 which comprises an upper section 60 and a lower section 70 mounted for orbital movement relative to a fixed open frame structure 16. The fixed structure rests on a floor 20 which carries ball transfer units 21 which support the lower section 70 of the movable frame housing 15 in movable relation thereto. A motor and crank device (not shown) is connected to the movable frame housing 15 to cause the latter to move relative to the fixed structure 16.

The fixed structure 16 includes upper inwardly directed tubular housings 32 terminating in ball transfer housings 34 in which ball transfers 36 are mounted for universal rotation and lower tubular housings 42 are provided at their inboard extremities with ball transfer housings 44 in which ball transfers 46 are mounted for universal rotation. The purpose of the ball transfer housings will be explained later.

The upper section 60 of the movable frame housing 15 supports an upper nozzle housing member 64 in vertically movable relation to a pair of vertically extending supporting columns 62. An air intake 65 is coupled to a plenum chamber (not shown) to bring air under pressure to the upper nozzle housing member 64 from the intake 65 to downwardly directed nozzles 66 at the bottom of the upper nozzle housing member 64.

Wing boxes 67, each provided with intake ports 68 that are flexibly connected to plenum chambers, are pivoted relative to the upper nozzle housing member 64 by means of pivots 69 carried at the bottom of the supporting columns 62. Additional nozzles extend downwardly from the upper wing boxes 67 into the space through which curved glass sheets are conveyed and in which they are supported for tempering.

The bottom section 70 is similar in arrangement to the upper section 60. The bottom section 70 is provided with supporting columns 72 for adjustably supporting the lower nozzle housing members 74. An air intake 75 is connected to a plenum chamber (not shown) through an additional flexible connection (not shown) in a manner similar to that of the air intake 65 of the upper section 60. Upwardly directed nozzles 76 are located in the upper wall of the lower nozzle housing member 74 for directing air blasts under pressure to the bottom surface of a glass sheet. Lower wing boxes 77 provided with intake supports 78 flexibly connected to independent pressure sources through flexible connections (not shown) are attached to the lower nozzle housing member 74 by means of pivots 79 carried by the upper extremities of the bottom section supporting columns 72. Additional nozzles extend upwardly from the lower wing boxes 77 into the space for the curved glass sheets.

Wear plates 81 are attached to the upper wing boxes 67 for contact with the upper ball transfers 36 and wear plates 82 are attached to the lower wing boxes 77 for abutment with the lower ball transfers 46. Thus, the upper wing boxes 67 are pivotally supported between the upper nozzle housing member 64 and the upper ball transfers 36, while the lower wing boxes 77 are pivotally supported between the lower nozzle member 74 and the lower ball transfers 46.

When a curved glass sheet, immediately after being bent, is transported into the space provided between the upper nozzle housing members 64 and its pivoted upper wing boxes 67 above the curved glass sheet and the lower nozzle housing member 74 and its pivoted lower wing boxes 77 below the heated curved glass sheet, air is supplied under pressure through the nozzles 66 of the upper nozzle housing member and the nozzles 76 of the lower nozzle housing member and lower wing boxes to direct fluid blasts downwardly onto the upper curved surface of the bent glass sheet and simultaneously direct fluid blasts upwardly onto the bottom curved surface of the bent glass sheet.

Each individual fluid blast moves in a closed orbital pattern defining a substantially circular motion in a curved surface substantially parallel relative to the curved surface of the glass sheet.

In one method of the present invention, the lower nozzle housing member 74 is adjusted to be spaced closer to the glass sheet G than the upper nozzle housing member 64, thereby providing less travel for the upwardly directed fluid blasts from the orifices of the upwardly directed nozzles 76 of the lower nozzle housing member 74 and its pivoted wing boxes 77 to reach the bottom surface of the glass sheet than for the downwardly directed fluid blasts from the orifices of the downwardly directed nozzles 66 of the upper nozzle housing member 64 and its pivoted upper wing boxes 67 to reach the upper surface of the bent heated glass sheet. The downwardly directed fluid blasts are diffused before contacting the glass to a greater extent than the upwardly directed blasts by virtue of the greater distance traversed from nozzle orifices to glass. Therefore, the glass receives a net upward force and the bottom surface is subjected to greater cooling effect than the top surface.

Another method of producing a net upward force involves supplying tempering fluid at less pressure at the orifice of each upper nozzle 66 than the pressure at the orifice of each lower nozzle 76 directly opposite thereto. A third method involves combining the first two methods. The differentials in pressure and/or travel distances are coordinated so that the net upward force on the glass sheet is sufficient to lift the sheet at least intermittently off the shaping surface.

Either of the expedients for varying the force applied to the opposite surfaces of the curved glass sheet results in an improved tension stress along a supported portion immediately inward of the edge of the glass. However, a combination of the two expedients, unequal nozzle to glass distances and unequal pressures, has been found to provide best results.

For glass sheets having a nominal thickness of about ¼ inch, a pressure differential of 4 ounces per square inch plus displacing the glass sheet to a position 2 inches closer to the bottom nozzles than the upper nozzles reduced maximum tension stresses along the portion in contact with the mold in some instances from as much as a stress associated with a strain of 600 millimicrons per glass thickness to a stress resulting in a strain as low as 50 millimicrons per glass thickness.

The particular means used in conjunction with this invention for optically measuring stress involves placing the sheets of bent and tempered glass between a polarized light source and a graduated quartz wedge. The quartz wedge is calibrated in millimicrons. The polarized light passes through the thickness dimension of the sheets to be measured and the quartz wedge. A trained observer viewing directly into the quartz wedge will see a distinctive band which delineates and defines the maximum deviation of polarized light caused by the particular type of stress being observed. The graduations on the quartz wedge permit a direct reading of the magnitude of the strain in millimicrons per glass thickness or the maximum deviation of a beam of polarized light from the path it would take through the thickness of the glass if the glass were unstressed.

The locality within the glass sheets which is to be measured is either selected or it is possible to locate the point of maximum stress by scanning the surface area of the glass sheets. The strain corresponding to the stress, at the selected locality, is then measured by looking through the quartz wedge directly into that locality.

The compressive stress of the peripheral margin of glass sheets bent and tempered on sectionalized molds is measured by looking at the surface of the sheets directly at their edge, i.e., the compressive stress zone. Similarly, the tensile stress of the peripheral margin of these sheets is measured a slight distance inwardly from the edge of the sheets, i.e., the tensile stress zone.

The graduations on the quartz wedge give the measured strain value in units of millimicrons per glass thickness. The measured strain value, adjusted to millimicrons per inch, may be converted to pounds per square inch stress units by multiplying by a stress factor. The stress factor will vary for different glass compositions. For commercial plate glass, such as used in automobile windshields, the stress factor is 2.13 pounds per square inch for each millimicron of strain per inch of glass thickness.

The conversion formula is $$S = K\frac{R}{b}$$

where

S is the stress in pounds per square inch;
K is the stress factor for converting strain units expressed as millimicrons per inch into stress units expressed as pounds per square inch;
R is the optical retardation in millimicrons;
b is the glass thickness in inches.

While a particular embodiment of the present invention has been disclosed, it is understood that the principles of the present invention are equally applicable when glass sheets are tempered by maintaining a heated bent glass sheet between nozzle members that are reciprocated rather than moved in orbital paths or even where the glass sheets are moved between opposing air blasts directed from orifices in the form of slots or other shapes which may be moved or held stationary relative to the path of movement of the glass undergoing the quenching step of tempering.

Furthermore, it is understood that while the particular embodiment described above relates to treating glass sheets supported adjacent their margin on an outline shaping surface that the present invention also provides improved stress pattern when the glass sheet is supported along its margin. In the claims, the term "marginal portion" is intended to cover the margin and a portion slightly inward of the margin.

What is claimed is:

1. In the method of fabricating a bent, tempered glass sheet from a heated bent glass sheet supported at its marginal portion on a curved, outline shaping mold which absorbs sufficient heat to retard the cooling rate of the portion of the heated, bent glass sheet in contact therewith, wherein relatively cold fluid blasts are simultaneously directed upwardly and downwardly against the lower and upper glass sheet surfaces, respectively, to chill said surfaces rapidly and temper the bent glass sheet, the improvement comprising:

applying said upwardly directed tempering fluid to the lower surface of the glass sheet to be tempered inwardly of said shaping mold to exert a relatively large force on said lower surface, applying said downwardly directed tempering fluid to the upper surface of the glass sheet to be tempered to exert a relatively small force on said upper surface, controlling the difference in force applied against said upper and lower glass sheet surfaces to provide a total force exerted on the lower surface of said glass sheet greater than a force equal to the sum of the total force exerted on the upper surface of said glass sheet and the weight of said glass sheet to elevate said glass sheet above said shaping mold a distance sufficient to permit the escape of said tempering fluid from beneath said glass sheet in a region at the edge thereof, whereby the total force applied by the tempering fluid to the lower surface of the glass sheet is reduced to permit said glass sheet to approach said shaping mold to a position ranging from one spaced slightly from said shaping mold to one engaging said shaping mold.

2. The improvement according to claim 1, wherein the upwardly directed tempering fluid is supplied in a plurality of fluid blasts each of which emanates from a tempering fluid source and controlling the spacing between said glass sheet and said tempering fluid sources until said total force is exerted on said lower surface of said glass sheet.

3. The improvement according to claim 1, whereby said total force applied by the tempering fluid to the lower surface of the glass sheet increases periodically as said glass sheet approaches said shaping mold, and decreases periodically as said glass sheet moves away from said shaping mold, thus causing said heet to move intermittently upward and downward relative to said shaping mold.

4. The improvement according to claim 3, wherein the glass sheet marginal portion contacts the shaping mold intermittently.

5. The improvement according to claim 1, wherein upper and lower fluid sources supply said downwardly directed and said upwardly directed tempering fluid, respectively, and said glass sheet is initially supported substantially equidistant between said fluid sources.

6. The improvement according to claim 1, wherein upper and lower fluid sources supply said downwardly directed and upwardly directed tempering fluid, respectively, and said glass sheet is initially supported closer to said lower fluid source than to said upper fluid source.

References Cited by the Examiner

UNITED STATES PATENTS

| 2,237,343 | 4/1941 | Engels | 65—348 X |
| 2,376,872 | 5/1945 | Harris | 65—351 X |
| 2,525,112 | 10/1950 | Baker | 65—348 X |
| 2,646,647 | 7/1953 | Bamford et al. | 65—347 X |
| 2,805,520 | 9/1957 | Black | 65—107 X |
| 2,886,922 | 5/1959 | Yando | 65—282 X |

DONALL H. SYLVESTER, *Primary Examiner.*

A. D. KELLOGG, *Assistant Examiner.*